US006226974B1

(12) United States Patent
Andrew et al.

(10) Patent No.: US 6,226,974 B1
(45) Date of Patent: May 8, 2001

(54) METHOD OF OPERATION OF INDUSTRIAL GAS TURBINE FOR OPTIMAL PERFORMANCE

(75) Inventors: Philip Lynn Andrew, Glenville; Paul Thomas Marks; Daniel Robert Dwyer, both of Clifton Park; John David Stampfli, Delmar; Joseph Anthony Cotroneo, Clifton Park; Harold Edward Miller, Scotia; Ronald Richard Wesorick, Albany, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/339,956

(22) Filed: Jun. 25, 1999

(51) Int. Cl.[7] ...................................................... F02C 13/10
(52) U.S. Cl. ............................................................ 60/39.02
(58) Field of Search ................................ 60/39.02, 39.03, 60/39.29; 415/27, 28

(56) References Cited

U.S. PATENT DOCUMENTS 4,813,226 * 3/1989 Grosselfinger et al. ............ 60/39.02
4,928,482   5/1990 Pollak et al. .
4,949,276 * 8/1990 Staroselsky et al. ................ 364/509
5,732,546   3/1998 Pineo et al. .
5,857,321   1/1999 Rajamani et al. .

* cited by examiner

Primary Examiner—Timothy S. Thorpe
Assistant Examiner—William H Rodriguez
(74) Attorney, Agent, or Firm—Nixon & Vanderhye

(57) ABSTRACT

A gas turbine operational strategy is provided for the optimization of ISO-Day rated performance. The invention is realized by setting the nominal operating line equal to or slightly below the operating limit line, so that ISO full load performance is maximized. Thus, the first stage turbine nozzle throat area is sized such that, without inlet bleed heat addition, and at Base-Load pressure ratio and firing temperature, the compressor operates within its operational limits on a ISO day. As ambient conditions change, levels of inlet bleed heat and firing temperature are controlled and the inlet guide vane angle is set whereby the nominal operating line is equal to or slightly below the operating limit line.

10 Claims, 5 Drawing Sheets

IMPROVED INDUSTRIAL GAS TURBINE COMPRESSOR MAP

METHOD OF OPERATION OF INDUSTRIAL GAS TURBINE FOR OPTIMAL PERFORMANCE

BACKGROUND OF THE INVENTION

The global market for efficient power generation equipment has been expanding in recent years and is anticipated to continue to expand in the future. The gas turbine combined cycle power plant is a preferred choice for this type of equipment due to relatively low plant investment costs and continuously improving operating efficiency of the gas turbine-based combined cycle which minimizes electricity production costs.

By way of background and with reference to the schematic illustration of FIG. 1, a typical combined cycle gas turbine includes, in serial-flow relationship, an air intake or inlet, a compressor, a combustor, a turbine, a heat recovery steam generator (HRSG) and its associated steam turbine. Thus, air enters the axial flow compressor at 10 at ambient conditions. Ambient conditions vary from one location to another and day to day. Therefore, for comparative purposes standard conditions are used by the gas turbine industry. Those standard conditions are 59° F./15° C., 14.696psia/ 1.013 bar and 60% relative humidity. The standard conditions were established by the International Standards Organization ("ISO") and are generally referred to as ISO conditions.

The compressed air enters the combustion system at 12 where fuel is injected and combustion occurs. The combustion mixture leaves the combustion system and enters the turbine at 14. In the turbine section, energy of the hot gases is converted into work. This conversion takes place in two steps. The hot gases are expanded and the portion of the thermo-energy is converted into kinetic energy in the nozzle section of the turbine. Then, in the bucket section of the turbine a portion of the kinetic energy is transferred to the rotating buckets and converted to work. A portion of the work developed by the turbine is used to drive the compressor whereas the remainder is available for generating power. The exhaust gas leaves the turbine at 16 and flows to the HRSG.

The Brayton cycle is the thermodynamic cycle upon which all gas turbines operate. Every Brayton cycle can be characterized by pressure ratio and firing temperature. The pressure ratio of the cycle is the compressor discharge pressure at 12 divided by the compressor inlet pressure at 10. The General Electric Co. (GE), and we, define the firing temperature as the mass-flow mean total temperature at the stage 1 nozzle trailing edge plane. Another method of determining firing temperature is defined in ISO document 2314 "Gas Turbine-Acceptance Test". The firing temperature in that case is a reference turbine inlet temperature and not generally a temperature that exists in a gas turbine cycle; it is calculated using parameters obtained in a field test. Thus, this ISO reference temperature is always less than the true firing temperature as defined by GE, above.

With reference to FIG. 2, the definition of firing temperature is illustrated by way of example. Plane A is the turbine inlet temperature, which is the average gas temperature in plane A ($T_A$). Plane B is the firing temperature as defined by GE, and by us, which is the average gas temperature in plane B, the stage 1 nozzle trailing edge plane. Plane C identifies the ISO firing temperature which is the calculated temperature in plane C, defined by $T_c = f(M_a, M_f)$.

A Brayton cycle may be evaluated using such parameters as pressure, temperature, specific heat, efficiency factors, and the adiabatic compression exponent. If such an analysis is applied to a Brayton cycle, the results can be displayed as a plot a cycle efficiency versus specific output of the cycle. Output per pound of airflow is an important determination since the higher this value, the smaller the gas turbine required for the same output power. Thermal efficiency is important because it directly affects the operating fuel costs.

Many factors affect gas turbine performance. Air temperature, for example, is an important factor in gas turbine performance. Since the gas turbine receives ambient air as inlet air, its performance will be changed by anything that affects the mass flow of the air intake to the compressor; that is changes from the reference conditions of 59° F. and 14.696 psia. Each turbine model has its own temperature-effect curve as it depends on the cycle parameters and component efficiencies as well as air mass flow.

It is also well known that elevated firing temperature in the gas turbine is a key element in providing higher output per unit mass flow, enabling increased combined cycle efficiency, and that for a given firing temperature, there is an optimal cycle pressure ratio which maximizes combined cycle efficiency. The optimal cycle pressure ratio trends higher with increasing firing temperature. Compressors for these turbines are thus subjected to demands for higher levels of pressure ratio, with the simultaneous goals of minimal parts count, operational simplicity, and low overall cost. Moreover, the compressor must enable this heightened level of cycle pressure ratio at a compression efficiency that augments the overall cycle efficiency. Finally, the compressor must perform in an aerodynamically and aeromechanically stable manner under a wide range of mass flow rates associated with varying power output characteristics of the combined cycle operation.

The maximum pressure ratio that the compressor can deliver in continuous duty is commonly defined in terms of a margin from the surge pressure ratio line. Compressor surge is the low frequency oscillation of flow where the flow separates from the blades and reverses flow direction through the machine, i.e., it serves as a physical limit to compressor operation at a given speed.

Conventional industrial gas turbine operational strategy has been to size the first-stage turbine nozzle throat area such that the compressor surge margin minimum limit is encountered under Power-Turn-Down, Cold-Day conditions. Nominal-flow Cold-Day may in some cases be the limiting operational condition. FIG. 3 illustrates the rationale for this prior art strategy. At the higher corrected speed associated with cold ambient conditions, the speed lines, e.g., 105%, 110%, 115% corrected speed, become closely spaced as the front stages of the compressor begin to aerodynamically choke. This causes the operating line pressure ratio to increase rapidly toward the surge line with increased speeds above 100% corrected speed. Consequently, the compressor surge margin decreases rapidly with increasing corrected speed. Accordingly, the first-stage turbine nozzle throat area has traditionally been sized such that the minimum level of surge margin experienced throughout the operational range occurs at Cold-Day conditions. This minimal level of surge pressure margin is intended to accommodate departures from new-and-clean conditions of the compressor blading, machine-to-machine variation, etc. As a result of this conventional approach, however, the surge margin at ISO-Day conditions is well in excess of the minimum safe margin, such that the rated pressure ratio delivered is well below the Cold-Day value and well below that which the compressor is capable of delivering.

BRIEF SUMMARY OF THE INVENTION

The present invention was derived from efforts to solve the requirement for high cycle pressure ratio commensurate with high efficiency and ample surge margin through-out the operating range of the compressor.

More particularly, it is an object of the invention to redistribute available surge margin uniformly throughout the operating range, such that the maximum pressure ratio deliverable by the compressor can be capitalized upon for improved combine-cycle efficiency. Thus, it is an object of the present invention to more fully utilize the pressure ratio capability of an industrial gas turbine compressor to achieve superior combined-cycle operating efficiency.

To achieve the objectives of the invention, the nominal line has been set equal to or slightly below the operating limit line, so that ISO full load performance is maximized. Thus, the first stage turbine nozzle throat area is sized such that, without inlet bleed heat addition, and at Base-Load pressure ratio and firing temperature, the compressor operates within its operational limits on a ISO day. As ambient conditions change, levels of inlet bleed heat and firing temperature are controlled and the inlet guide vane angle is set whereby the nominal operating line is equal to or slightly below the operating limit line.

This invention provides a design and operational strategy which provides optimal pressure ratio and surge margin both for the case where the inlet guide vanes are tracking along the nominal, full flow schedule and wherein the inlet guide vanes are closed down for reduced flow under Power Turn-Down conditions.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE INVENTION

Efficient operation of the gas turbine requires that a number of critical turbine operating parameters be processed to determine optimal settings for controllable parameters such as fuel flow and distribution and intake air flow. Such operating parameters include compressor inlet and outlet temperatures and pressures, exhaust temperature and pressure and the like. Thus, control of the power generated by a gas turbine is typically exercised through control of the fuel flow and air flow into the combustor.

One example of a control system for a gas turbine is the General Electric Co.'s Speedtronic™ Mark V Control System, which is designed to fulfill all gas turbine control requirements, including speed and load control functions which act to control fuel flow under part-load conditions and temperature control which limits fuel flow to a maximum consistent with achieving rated firing temperatures, and controls air flow via the inlet guide vanes. The Mark V Control System also handles sequencing of the auxiliaries to allow fully automated start-up, shut-down and cool-down. Incorporated in the basic system are turbine protection against adverse operating situations and annunciation of abnormal conditions. The operator interface to the Mark V Control System is in the form of a colorgraphic monitor and keyboard to provide feedback to the operator regarding current operating conditions and to allow input commands from the operator.

As noted above, the control system performs many functions including fuel, air and emissions control, sequencing of turbine fuel and auxiliary for start up, shutdown and cool down, synchronization and voltage matching of generator and system, monitoring of all turbine, control and auxiliary functions, and protection against unsafe and adverse operating conditions. All of these functions are performed in an integrated manner to perform the desired pre-programmed and/or operator input control philosophy.

Figure 4:
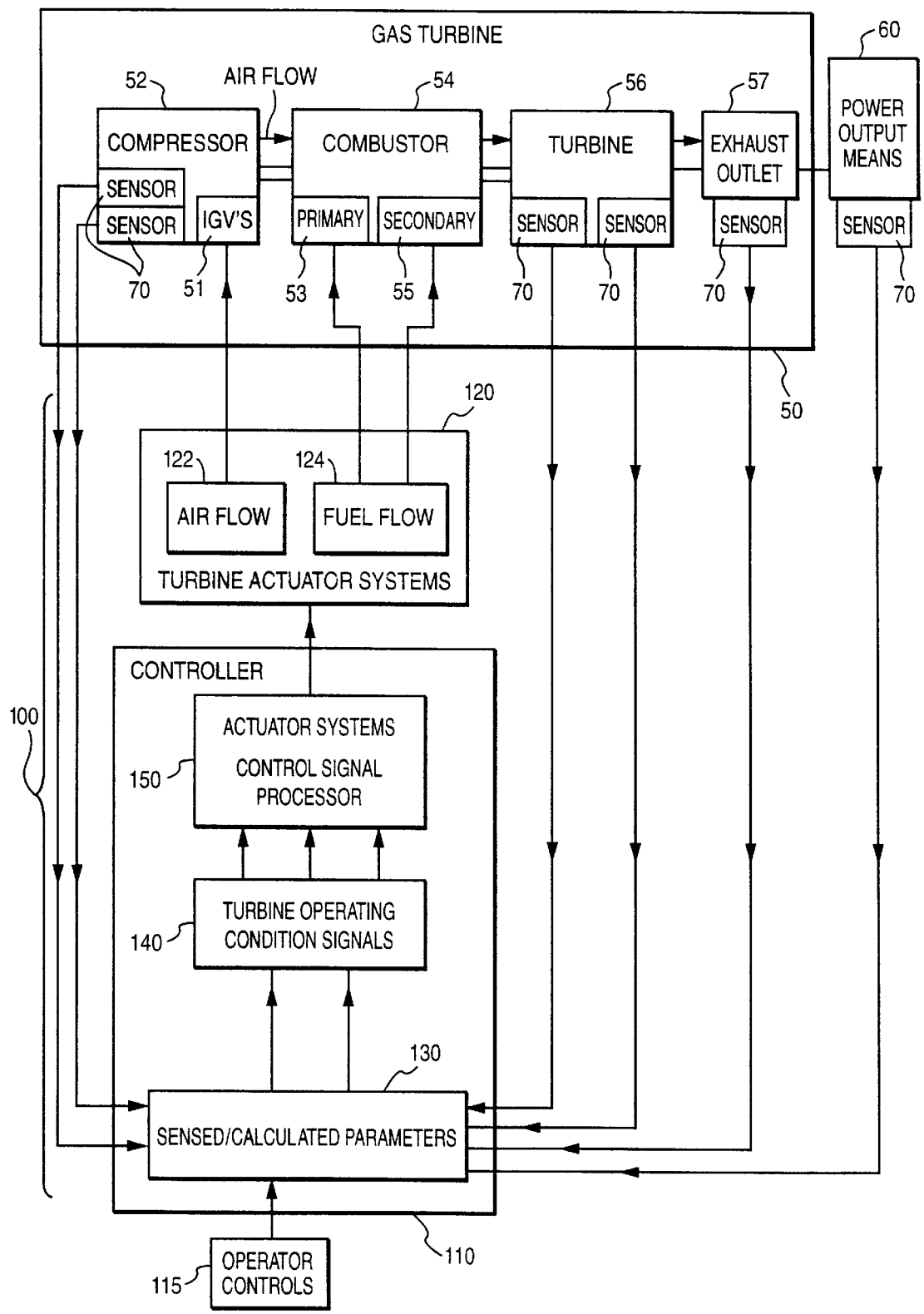
FIG. 4 is a block diagram of a gas turbine having a turbine control system for implementing the improved control in accordance with the invention.

An exemplary turbine gas control system 100 is shown in the block-diagram of FIG. 4. This control system is disclosed in greater detail in U.S. Pat. No. 5,857,321, the disclosure of which is incorporated herein by this reference. The gas turbine control system 100 is coupled to a gas turbine 50 to govern the operation of the turbine. As noted above, the gas turbine 50 typically comprises a compressor 52, a combustor 54, a turbine section 56, and an exhaust outlet 57. Gas turbine 50 is further typically coupled to a power output means 60, such as an electric generator, that is driven by turbine 50. Operation of turbine 50 may include, for example, a start up of the turbine, loading of the turbine, maintaining a steady state loaded condition so as to provide stable power output while optimizing fuel use and emission generation, and shutdown of the turbine.

Control system 100 comprises a controller 110 that is coupled to receive input from a plurality of sources, such as operation controls 115 and a plurality of sensors 70 coupled to turbine 50 and power output means 60. Controller 110 typically comprises an electronic processor adapted to generate a plurality of control signals in response to the plurality of input signals processed. As used herein, "adapted to" and the like refers to a device that comprises the circuitry and programming to enable the processing of signals representing turbine operating parameters in accordance with selected functions that enable the generation of a desired command to control turbine operation. Generating signals "in response to" or "in correspondence with" typically refers to processing the signals in accordance with a predetermined function that represents the relation between one or more parameters, and is typically represented by mathematical equations. One example of controller 110 is the GE, Mark V controller. Controller 110 may comprise one or more electronic-type processing devices, such microprocessor chips, application-specific integrated circuits, signal conditioning circuitry, or the like. Alternatively, optical signal processors can be used in some applications for control of systems in which data are transmitted by means of optical energy.

Controller 110 is coupled to a system of turbine actuators 120 that are used to maintain or establish a particular turbine operating regime. By way of example and not limitation, actuator systems 120 typically comprise an air flow control actuator 122 and a fuel flow actuator 124. Air flow actuator 122 comprises a device for controlling air flow into compressor 52, such as a positioning control for inlet guide vanes 51. Similarly, fuel flow actuator 124 comprises one or more devices for controlling fuel flow to the combustor, such as valves for throttling fuel flow into combustor 54; in some, but not all combustors, such fuel flow may be controlled by a primary zone fuel control valve 53 and also a secondary zone fuel control valve 55. For example, the primary fuel supply is mixed with inlet air prior to being burned in the combustion chamber and the secondary fuel supply is used to supply the flame in the combustion chamber. Such an arrangement is one means by which emissions from turbine 50 can be reduced; the effectiveness of the emissions reduction necessitates accurate control of the relative proportions of fuel being delivered by the primary and secondary manifolds. Controller 110 can also be coupled to additional actuating systems, such as bleed valves and cooling flow control valves that remove part of the air flowing from the discharge of the compressor for use in other control needs, discussed below with reference to FIG. 5.

Controller 110 is coupled to receive signals from the plurality of sensors 70 that in turn are coupled to gas turbine 50 and load 60. Such sensors typically comprise temperature sensors, pressure sensors, flow sensors, humidity sensors, speed sensors, flame detector sensors, valve position sensors, guide vane angle sensors, or the like that sense various parameters pertinent to the operation of gas turbine 50. As used herein, "parameters" and similar terms refer to items that can be used to define the operating conditions of turbine 50, such as temperatures, pressures, and flows at defined locations in the turbine that can be used to represent a given turbine operating condition. Sensors 70 are typically coupled to controller 110 via a sensed parameters coupling device 130 such as a terminal board or the like.

Controller 110 further comprises processing means 140 for representing turbine operating conditions, such as with electrical signals that are representative of selected turbine operating parameters. Such turbine operation condition signals may be directly sensed, such as selected temperatures or pressures, or alternatively, may comprise calculated values (that is, determined from models embedded in controller 110 processor programming) for operating conditions parameters that are either difficult (or impossible) to directly measure (or sense). Commonly, turbine operating condition parameters that are calculated represent internal cycle parameters of the turbine, that is, values that are not directly measurable, but that can be represented (at least over a narrow range of sensed input values) by mathematical models representing sets of non-linear equations.

Turbine operating condition signals 140 are in turn coupled to an actuator system control signal processor 150 for generating control signals to turbine actuator systems 120 in correspondence with the turbine operating condition signals, for implementing the pre-programmed or input control strategy, discussed below.

Figure 5:
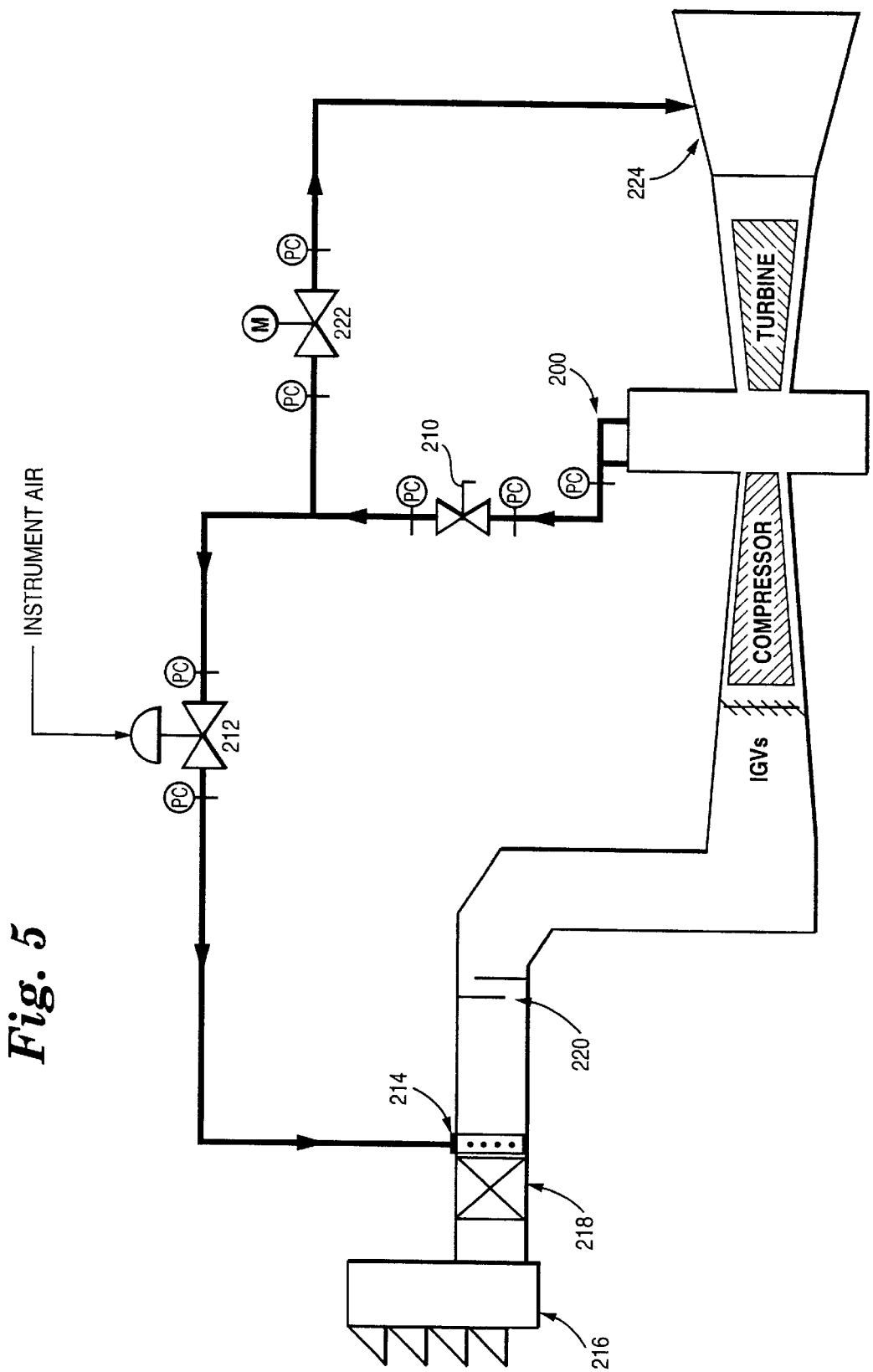
FIG. 5 is a schematic illustration of an exemplary inlet bleed heat system for use in the implementation of the invention.

Referring to FIG. 5, an inlet bleed heat system is schematically illustrated. Inlet bleed heat (IBH) is typically used to protect the gas turbine compressor from icing when operating at reduced IGV angles. Moreover, IBH systems are used to reduce compressor pressure ratio at certain operating conditions where additional compressor operating margin is required. As illustrated, in a typical inlet bleed heat system, a compressor discharge extraction manifold 200 is provided for extracting compressor discharge air, which flows through a manual isolation valve 210 and control valve 212 to an inlet bleed heat manifold 214 disposed downstream of inlet air filter house 216 and inlet silencer 218 but upstream of inlet trash screen 220. In the illustrated system, a drain valve 222 is provided for diverting condensate to the turbine exhaust 224.

Referring again to FIG. 3, there is illustrated a typical gas turbine compressor map which is a plot of pressure ratio versus flow. The prior art compressor map is defined by several lines of constant rotational speed corrected to ISO conditions of 14.696 psia and 518.67° R.

Figure 1:
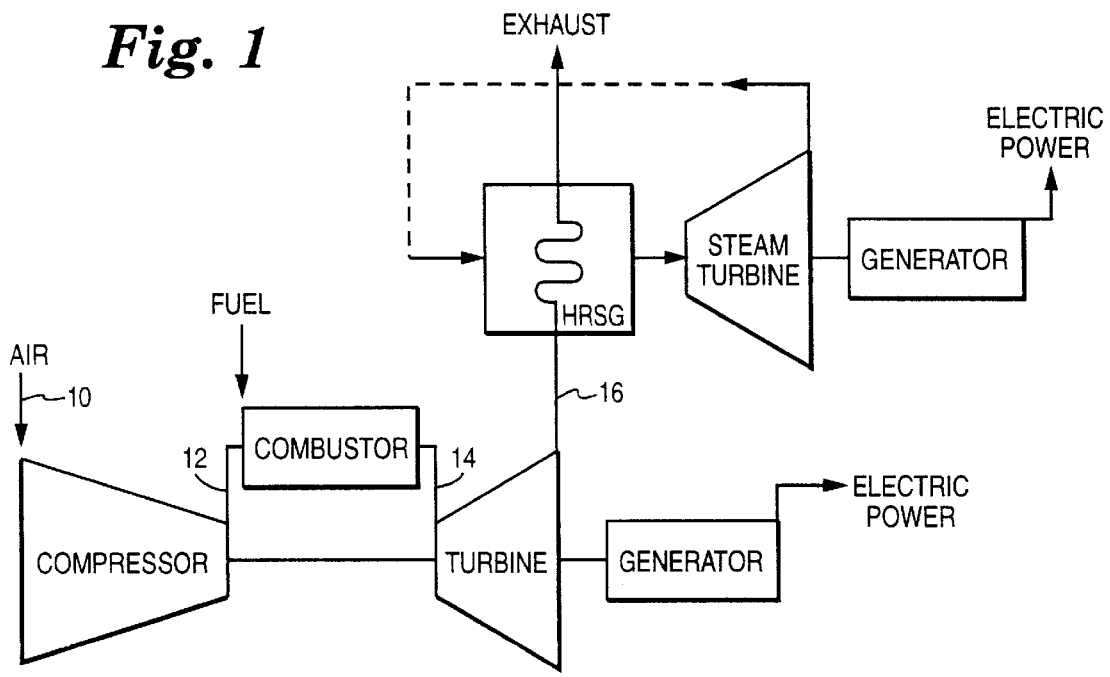
FIG. 1 is a schematic diagram for a combined cycle gas turbine.
Figure 2:
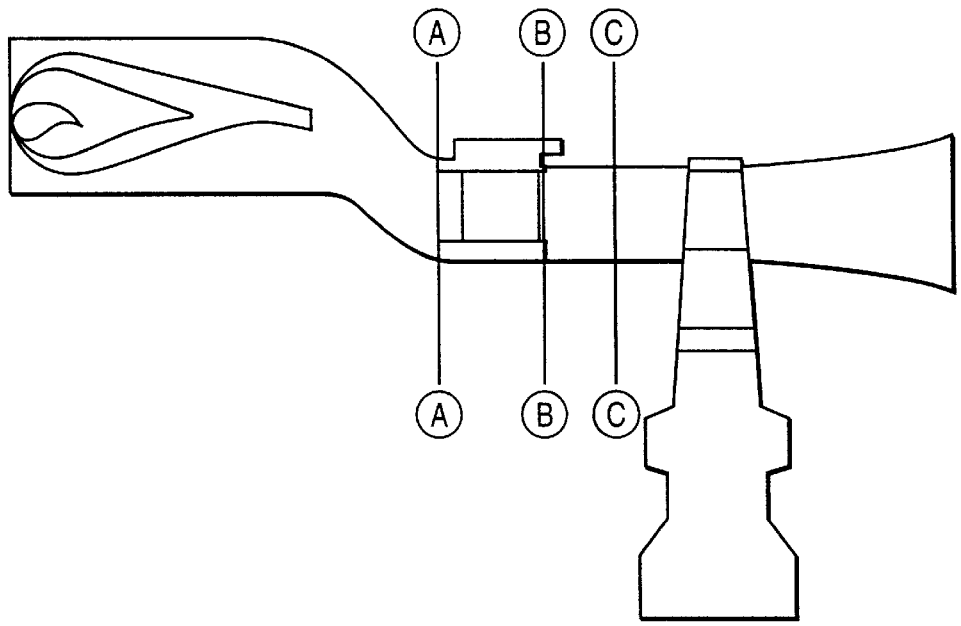
FIG. 2 is a schematic illustration showing the definition of firing temperature.
Figure 3:
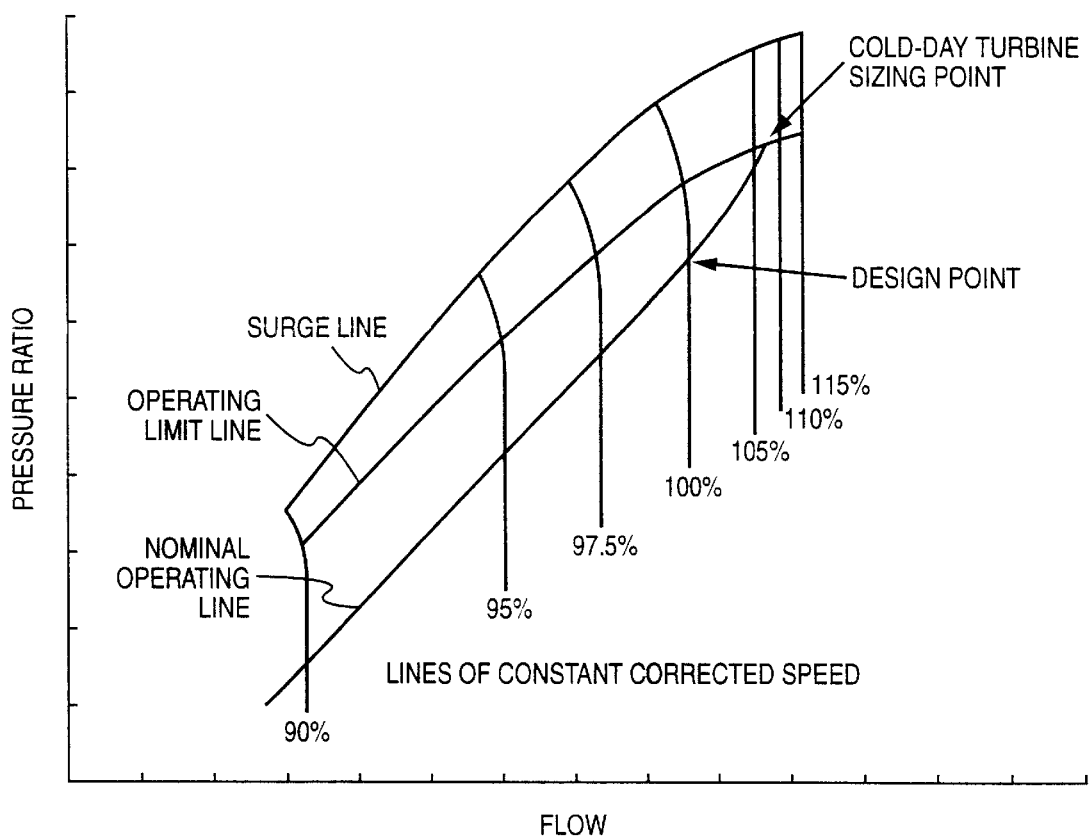
FIG. 3 is a map illustrating the performance characteristics of a conventional industrial gas turbine compressor.

The map of FIG. 3 is further defined by a line of surge pressure ratios. As noted above, the surge line is that pressure ratio at which the flow separates from the blades and reverses direction, i.e., the limit of the compressor at a given speed.

An operating limit line is defined to provide a constant margin from the pressure ratios associated with operational limits, taking into account both surge pressure ratio and flow roll-back. These operational limits include the onset of rotating stall and the onset of excessive blade strains, at elevated pressure ratios near the surge line. Operation above the operating limit line is not permitted by the gas turbine control system. Thus, the operating limit line is the line established by the operator of the gas turbine as the maximum operating limit for the compressor.

The nominal operating line is the operating condition at which the turbine and compressor will operate at varying speed. A nominal operating line of allowable combinations of pressure ratio and flow, is defined by the first-stage turbine nozzle area which is chosen to provide a desired surge margin at Cold-Day conditions. A design point is defined as the intersection of the 100% corrected speed line and the nominal operating line.

As can be seen from FIG. 3, and as discussed above, the nominal operating line rapidly migrates to higher pressure ratios at corrected speeds above the design point due to aerodynamic choking in the front stages of the compressor. Thus, there is a reduction in surge margin with increasing corrected speed above the design point. Conventionally, the minimum acceptable margin from surging pressure ratio at the high corrected speed associated with Cold-Day operation dictates the first-stage turbine nozzle flow area. This has the negative consequence of excessive and under-utilized surge margin at the design point.

Figure 6:
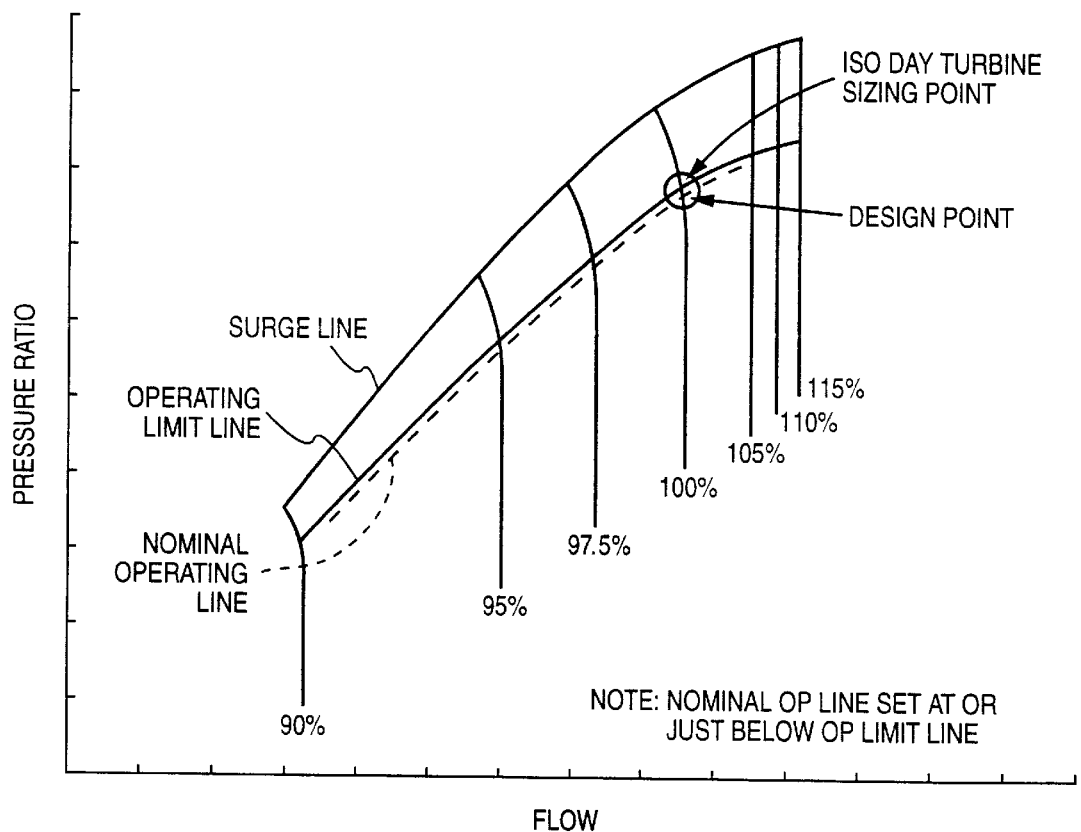
FIG. 6 is an improved compressor map in accordance with the present invention,.

An improved compressor map embodying the invention, is shown in FIG. 6. As shown by the dashed line, the nominal operating line has been set equal to or slightly below the operating limit line. FIG. 6 illustrates the improved compressor map for both the case wherein the inlet guide vanes (IGV) are tracking along the full-flow schedule and for the case where the IGVs are closed down for reduced flow under power turn-down conditions.

In accordance with the invention, the first stage nozzle area is set to maximize the ISO pressure ratio. Thus, the first-stage turbine nozzle throat area is sized such that, without inlet bleed heat addition, and at Base-Load pressure ratio and firing temperature, the compressor operates within its operational limits on an ISO Day.

Cold-Day and part load surge issues are handled by increasing inlet bleed heat (IBH), depressing firing temperature (Tf) and limiting the minimum operation inlet guide vane (IGV) angle setting.

Accordingly, as shown in FIG. 6, the design point pressure ratio has been elevated considerably relative to the compressor map shown in FIG. 3, enabling the attainment of higher combined-cycle operating efficiency.

The constant surge margin (which may be about 5% to about 20% depending upon the system, location, and other factors and considerations) is maintained throughout the operating range by a combination of selective application of elevated levels of inlet bleed heat and selectively depressing firing temperature. Inlet bleed heat serves to maintain surge margin in two ways. First, inlet bleed heat lowers the operating line away from the surge line. Second, the heating of the inlet flow with inlet bleed heat on a Cold-Day reduces the corrected speed and thus reduces migration from the design point. Reduction in firing temperature reduces the operating line and thus increases surge margin throughout the map. However, as noted above, elevated firing temperature in the gas turbine is a key element in providing higher output per unit mass flow. Thus, in accordance with the presently preferred implementation of the control strategy of the invention, elevated levels of inlet bleed heat are preferably selectively applied as needed in order to lower the compressor operating line, to minimize the need to lower the compressor operating line by decreasing firing temperature.

By way of example, inlet bleed heat control for compressor operating limit protection can feature a compressor operating limit map built into the control software as a protective control reference. The compressor pressure ratio is calculated from inlet and discharge pressure transducers measurements and used as a feedback signal for closed loop control. The amount of inlet bleed heat can then be regulated using the protective reference and the pressure ratio measurement feedback, and other suitable sensed/calculated parameters. As presently proposed, up to a maximum of, e.g., 5% compressor discharge flow can be extracted to limit the pressure ratio. If the bleed heat has reached its maximum contribution of 5% flow, and the error condition(s) have not been satisfied, firing temperature may be selectively depressed and/or the minimum operation inlet guide vane angle setting may be limited.

As can be seen, the present invention is embodied in an industrial gas turbine axial flow compressor which is operated at a pressure ratio significantly above the pressure ratio normally delivered by a machine of this type. Moreover, a constant margin is maintained between the base-load pressure ratio and pressure ratios associated with operational limits, throughout the base-load operating range. The operational limits referred to herein include the onset of rotating stall, and the onset of excessive blade strains at elevated pressure ratios near the surge line.

Thus, to maintain a constant margin between the operational pressure ratio and pressure ratios associated with operational limits, elevated levels of inlet bleed heat are selectively applied during Cold-Day operation in order to lower the compressor operating line. The selective application of elevated levels of inlet bleed heat during Cold-Day operation also minimizes the excursion to higher corrected speed, and thereby minimizes the need to lower the compressor operating line by decreasing Firing Temperature. This also maintains a constant margin.

Moreover, to maintain a constant margin, elevated levels of inlet bleed heat are applied during Power-Turn-Down operation in order to lower the compressor operating line. The elevated levels of inlet bleed heat applied during Power-Turn-Down operation also minimize the excursion to higher corrected speed, and thereby minimize the need to lower the compressor operating line by decreasing Firing Temperature. This too maintains a constant margin between the operational pressure ratio and pressure ratios associated with operational limits.

Firing temperature may also be selectively depressed during Cold-Day operation, as necessary, in order to maintain a constant margin. During Power-Turn-Down operation firing temperature may also be depressed, as necessary, in order to maintain a constant margin.

To maintain a constant margin between the operational pressure ratio and pressure ratios associated with operational limits, Power-Turn-Down flow reduction may be limited as necessary by limiting the minimum operation inlet guide vane angle setting.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling a gas turbine to optimize performance thereof, comprising:

providing a control system including a controller coupled to a plurality of turbine actuator systems, said actuator systems being coupled to a single-shaft gas turbine that includes a compressor, a combustor, and a combustion turbine, so as to control the operation of the gas turbine in response to respective actuator system control signals generated by the controller, said control system further comprising an operator interface; the controller comprising a processor for generating said respective actuator system control signals in correspondence with input from said operation interface and a plurality of turbine operating conditions signals, said control system being programmed to define a pressure ratio operating limit line that provides a substantially constant surge margin from a surge line defined by pressure ratios associated with physical limits to compressor operation for the gas turbine;

sizing a first-stage turbine nozzle throat area of said gas turbine so as to maximize an ISO pressure ratio thereof, and operating said control system so that a nominal operating line of the gas turbine is equal to or slightly below said operating limit line, whereby a substantially constant margin is maintained between the operational pressure ratio of the gas turbine and pressure ratios associated with operational limits at elevated pressure ratios near the surge line, wherein said control system is operated to maintain a substantially constant margin by controlling inlet temperature, airflow and fuel flow.

2. A method as in claim 1, wherein said control system is operated to maintain said substantially constant margin by at least one of elevating inlet bleed heat, depressing firing temperature, and limiting minimum operation inlet guide vane angle setting.

3. A method as in claim 2, wherein said step of operating comprises selectively applying elevated levels of inlet bleed heat during Power Turn-Down operation to lower the compressor operating line, thereby to maintain said substantially constant margin.

4. A method as in claim 2, wherein said step of operating comprises selectively applying elevated levels of inlet bleed heat during Cold-Day operation in order to minimize excursion to higher corrected speed, and thereby minimize a need to lower the compressor operating line by decreasing firing temperature, thereby to maintain said substantially constant margin.

5. A method as in claim 2, wherein said step of operating comprises selectively applying elevated levels of inlet bleed heat during Power Turn-Down operation in order to minimize excursion to higher corrected speed, and thereby minimize a need to lower the compressor operating line by decreasing firing temperature, thereby to maintain said substantially constant margin.

6. A method as in claim 2, wherein said step of operating said control system comprises selectively depressing firing temperature during Cold-Day operation, thereby to maintain said substantially constant margin.

7. A method as in claim 2, wherein said step of operating said control system comprises selectively depressing firing temperature during Power Turn-Down operation, thereby to maintain said substantially constant margin.

8. A method as in claim 2, said step of operating said control system comprises selectively limiting Power Turn-Down flow reduction by limiting the minimum operation inlet guide vane angle setting, thereby to maintain said substantially constant margin.

9. A method as in claim 2, said step of sizing comprises sizing said first-stage turbine nozzle throat area such that, without inlet bleed heat addition, and at Base-Load pressure ratio and firing temperature, the compressor operates within its operational limits on an ISO Day.

10. A method as in claim 1, wherein said operational limits include the onset of rotating stall, and the onset of excessive blade strains.

* * * * *